United States Patent [19]

Cottis

[11] Patent Number: 4,639,504

[45] Date of Patent: Jan. 27, 1987

[54] PRODUCTION OF THERMALLY STABILIZED AROMATIC POLYESTERS

[75] Inventor: Steve G. Cottis, Fort Wright, Ky.

[73] Assignee: Dart Industries Inc., Northbrook, Ill.

[21] Appl. No.: 734,953

[22] Filed: May 16, 1985

Related U.S. Application Data

[63] Continuation of Ser. No. 386,452, Jun. 8, 1982, abandoned.

[51] Int. Cl.$^4$ .............................................. C08G 63/60
[52] U.S. Cl. ................... 528/176; 528/125; 528/126; 528/128; 528/167; 528/169; 528/173; 528/179; 528/184; 528/190; 528/206; 528/207; 528/210; 528/271
[58] Field of Search ............... 528/167, 169, 173, 176, 528/179, 184, 190, 206, 207, 125, 126, 128, 210, 271

[56] References Cited

U.S. PATENT DOCUMENTS

| | | | |
|---|---|---|---|
| 2,728,747 | 12/1955 | Aelony | 528/179 |
| 4,101,526 | 7/1978 | Buxbaum | 528/179 |
| 4,229,565 | 10/1980 | Gardner et al. | 528/169 |
| 4,385,145 | 5/1983 | Horn | 524/120 |

FOREIGN PATENT DOCUMENTS

| | | |
|---|---|---|
| 23201A | 12/1968 | Australia . |
| 567821 | 12/1958 | Canada . |
| 5858 | 12/1979 | European Pat. Off. . |
| 28687 | 5/1981 | European Pat. Off. . |
| 1140289 | 6/1957 | France . |
| 588834 | 6/1947 | United Kingdom . |
| 978304 | 12/1964 | United Kingdom . |
| 1283247 | 7/1972 | United Kingdom . |
| 1363935 | 8/1974 | United Kingdom . |
| 1398178 | 6/1975 | United Kingdom . |
| 1502487 | 3/1978 | United Kingdom . |
| 2058102 | 4/1981 | United Kingdom . |

*Primary Examiner*—Lucille M. Phynes
*Attorney, Agent, or Firm*—Jones & Askew

[57] ABSTRACT

The production of oxybenzoyl polyesters is facilitated by the incorporation of a phosphite, particularly an organic phosphite, during the production enabling the production of molded articles from these polyesters of improved appearance and excellent properties.

25 Claims, No Drawings

PRODUCTION OF THERMALLY STABILIZED AROMATIC POLYESTERS

This application is a continuation of application Ser. No. 386,452, filed 6/8/82, now abandoned.

BACKGROUND OF THE INVENTION

The present invention relates to an improved process for the production of copolyesters. More particularly, it relates to a process for the production of oxybenzoyl polyesters of aromatic dicarboxylic acids, bisphenols and p-hydroxybenzoic acid compounds as the starting materials.

It is known that such polyester resins can be produced by various polymerization processes including suspension polymerization and bulk polymerization. Of these, the bulk polymerization process is perhaps the most desirable process in terms of economy. However, since the aromatic polyesters have a high melting point as compared with aliphatic polyesters, such as polyethylene terephthalate, a higher temperature is required to maintain the aromatic polyesters at their molten state. Consequently, the polymers are often colored and deteriorated in performance.

Much effort has therefore been expended on the development of a process which eliminates the disadvantages discussed above and provides a polyester molding material from which articles of pleasing and uniform appearance and properties can be obtained.

THE INVENTION

According to the present invention, there can be produced a polymer having an extremely low degree of coloration and an excellent heat stability which has hitherto not been obtainable by the conventional bulk polymerization.

It is an object of the present invention to provide a process for the production of aromatic polyesters having an extremely low degree of coloration and an excellent heat stability.

It is another object of the invention to provide an improved process for the economic production of aromatic polyesters.

Other objects and further scope of the applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

It has been found that a process overcoming the problems encountered in the practice of the prior art processes and providing polyester resins whose use is not attended by the noted drawbacks is provided by the improvement which comprises adding a phosphite during the preparation of the resin and, particularly to the prepolymer melt prior to advancement of the final product to the desired degree of polymerization.

The wholly aromatic polyesters towards whose production the present invention is directed consist of combinations of repeating units of one or more of the following formulae:

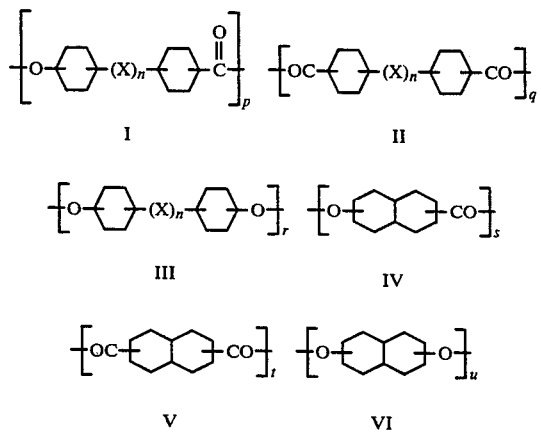

where x is O, S,

NH, or $SO_2$ and n is 0 or 1 and the total of the integers $p+q+r+s+t+u$ in the moieties present is from about 3 to about 800.

Combinations of the above units include union of the carbonyl group of Formulae I, II, IV and V with the oxy group of Formulae I, III, IV and VI. In the most general combination all units of the above formalae can be present in a single copolymer. The simplest embodiment would be homopolymers of units I or IV. Other combinations include mixtures of units II and III, II and VI, III and V, V and VI, and I and IV.

The location of the functional groups are preferably in the para (1,4) positions. They can also be located in meta (1,3) position to each other. With respect to the naphthalene moiety, the most desirable locations of the functional groups are 1,4; 1,5 and 2,6. Such groups can also be in the meta position to each other.

The symbols p, q, r, s, t and u are integers and indicate the number of moieties present in the polymer. The total (p+q+r+s+t+u) can vary from 3 to 800 and, when present, the ratio of q/r, q/u, t/r, t/u,

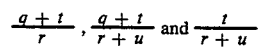

can vary from about 10/11 to about 11/10 with the most preferable ratio being 10/10.

Exemplary of materials from which the moieties of Formula I may be obtained are p-hydroxybenzoic acid, phenyl-p-hydroxybenzoate, p-acetoxybenzoic acid and isobutyl-p-acetoxybenzoate. Those from which the moiety of Formula II is derivable include terephthalic acid, isophthalic acid, diphenyl terephthalate, diethyl isophthalate, methylethyl terephthalate and the isobutyl half ester of terephthalic acid. Among the compounds from which the moiety of Formula III results are p,p'-bisphenol; p,p'-oxybisphenol; 4,4'-dihydroxybenzophenone; resorcinol and hydroquinone. Inspection will show which of these materials are also suitable for supplying the moieties of Formulae VI-VIII.

Examples of monomers represented by Formula IV are 6-hydroxy-1-naphthoic acid; 5-acetoxy-1-naphthoic acid and phenyl 5-hydroxy-1-naphthoate. Monomers representing Formula V include 1,4-naphthalenedicarboxylic acid; 1,5-naphthalenedicarboxylic acid and 2,6-naphthalenedicarboxylic acid. The diphenyl esters or dicarbonyl chlorides of these acids can be also be used. Examples of monomers representative of Formula VI are 1,4-dihydroxynaphthalene; 2,6-diacetoxynaphthalene and 1,5-dihydroxynaphthalene.

Particularly preferred for use in the practice of the present invention are plastic materials based upon oxybenzoyl polyesters.

The oxybenzoyl polyesters useful in the present invention are generally those repeating units of Formula VI:

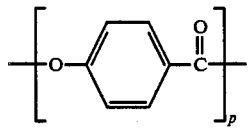

(VI)

where p is an integer of from about 3 to about 600.

One preferred class of oxybenzoyl polyesters are those of Formula VII:

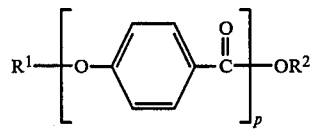

(VII)

wherein $R^1$ is a member selected from the group consisting of benzoyl, lower alkanoyl, or preferably hydrogen; wherein $R^2$ is hydrogen, benzyl, lower alkyl, or preferably phenyl; and p is an integer from 3 to 600 and preferably 30 to 200. These values of p correspond to a molecular weight of about 1,000 to 72,000 and preferably 3,500 to 25,000. The synthesis of these polyesters is described in detail in U.S. patent application Ser. No. 619,577, filed Mar. 1, 1967, and now abandoned, entitled "Polyesters Based on Hydroxybenzoic Acids", the disclosure of which is incorporated herein by reference. This application is referred to in U.S. Pat. No. 3,668,300.

Another preferred class of oxybenzoyl polyesters are copolyesters of recurring units of Formulas VII, VIII and IX:

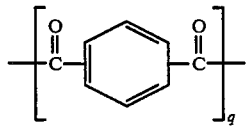

(VIII)

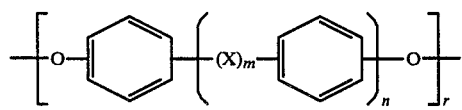

(IX)

wherein X is —O— or —SO$_2$—; m is 0 or 1; n is 0 or 1; q:r=10:15 to 15:10; p:q=1:100 to 100:1; p+q+r=3 to 600 and preferably 20 to 200. The carbonyl groups of the moiety of Formula I or III are linked to the oxy groups of a moiety of Formula I or IV; the oxy groups of the moiety of Formula I or IV are linked to the carbonyl groups of the moiety of Formula I or III.

The preferred copolyesters are those of recurring units of Formula X:

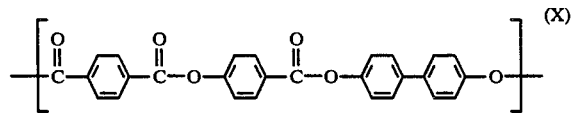

(X)

The synthesis of these polyesters is described in detail in U.S. Pat. No. 3,637,595, entitled "P-Oxybenzoyl Copolyesters", the disclosure of which is incorporated herein by reference.

The bulk condensation of aromatic polyesters is described in the patent literature and broadly considered involves an alkanoylation step in which a suitable dicarboxylic acid, hydroxybenzoic acid and diol are reacted with an acid anhydride, a prepolymerization step in the reaction product of the first step is polycondensed to prepare a prepolymer and the prepolymer is thereafter heated to produce a polycondensate of the desired degree of polymerization.

The polyesters useful in the present invention can also be chemically modified by various means such as by inclusion in the polyester of monofunctional reactants such as benzoic acid or tri- or higher functional reactants such as trimesic acid or cyanuric chloride. The benzene rings in these polyesters are preferably unsubstituted but can be substitued with non-interfering substituents, examples of which include among others halogen such as chlorine or bromine, lower alkoxy such as methoxy and lower alkyl such as methyl.

The phosphite can be an organic or inorganic phosphite. However, the use of an organic phosphite, such as an alkyl phosphite, an aryl phosphite, an alkyl-aryl phosphite or a di- or polyphosphite is preferred. More particularly, the following phosphites can be employed:
Diisooctyl Phosphite
Distearyl Phosphite (Solid)
Triisodecyl Phosphite
Triisooctyl Phosphite
Trilauryl Phosphite
Diphenyl Phosphite
Trisnonylphenyl Phosphite
Triphenyl Phosphite
Diphenylisodecyl Phosphite
Diphenylisooctyl Phosphite
Phenyldiisodecyl Phosphite
Diisodecyl Pentaerythritol Diphosphite
Tetraphenyl Dipropyleneglycol Diphosphite
Poly(dipropyleneglycol)Phenyl Phosphite
Dilauryl Phosphite
Ethyl Hexyl Diphenyl Phosphite
Phenyl Neopentylglycol Phosphite
Diisooctyl Octylphenyl Phosphite
Distearyl Pentaerythritol Diphosphite (Flake).

While the addition of the phosphite at any stage of the procedure is contemplated, it has been found to be particularly effective, and to provide markedly superior properties in the articles molded from the oxybenzoyl polyester resin, if the phosphite is added shortly before, for example about five minutes before, the prepolymer is transferred to the next stage, as by dumping into an insulated tray wherein an intermediate stage of polymerization takes place before the thus advanced resin is transferred to suitable equipment, for example a rotary heating drum, for advancement to the desired stage of polymerization.

In another approach to the determination of the optimum point for addition of the phosphite, it has been found that the phosphite can most advantageously be added at about 95% conversion as indicated by the distillate yield of acetic acid.

The phosphite can be added as solid flakes or as a liquid melt at a temperature above the melting point of the phosphite. It is also possible to add the phosphite in a solution in acetic anhydride when incorporation is effected at a lower temperature. Addition in melt form is in general preferred.

The amount of phosphite added is dependent on the purity of the monomer. The purer the monomer, the less phosphite need be added to achieve the desired result. The purity is related to the phenol and the amount of phenol employed and to the amount of ash produced. When there is a higher ash content, increased amounts of phosphite will be required to achieve optimum results, which requires a balancing of the achievement of the optimum levels for the achievement of optimum results in achieving the desired color and the desired level of thermal stability.

Broadly, the phosphite has been added over a range of from about 0.05 parts per hundred to about 0.5 parts per hundred. However, the preferred range is from about 0.1 to about 0.25 parts per hundred with 0.125 parts per hundred representing the optimum proportion.

The invention is illustrated by the following examples which are not to be construed as limiting the present invention, the scope of which is defined by the appended claims.

The following example provides a control in which no additive is present.

EXAMPLE 1

Control

A charge of 207.3 g (1.096 moles) of 4,4'-dihydroxybiphenyl (Assay 98.5%), 307.6 g (2.23 moles) of 4-hydroxybenzoic acid, 185 g (1.11 moles) of terephthalic acid and 498 g (4.88 moles, 10% excess) of acetic anhydride was refluxed with stirring for three hours. The contents of the reactor were then blanketed with nitrogen and the mixture heated at an average rate of 30° C./hr to 295° C. and held for one-half hour at this temperature. At this point, the reaction mixture was dumped into a pyrex dish lined with aluminum foil and the resulting prepolymer ground and passed through a 20 mesh screen.

The above prepolymer (5.464 g) was inserted into a tube furnace already preheated to 229° C. With a slight nitrogen sweep the temperature of the material was raised to 360° C. in four hours and held at 360° C. for one hour.

After cooling, the material was weighed and the weight loss from prepolymer to advanced polymer was found to be 3.6%. This polymer showed a peak endotherm at 417° C. as determined by differential scanning calorimetry (DSC) under nitrogen. The resin showed a total weight loss in air of 3.6% when heated at 400° C. for three hours using thermogravimetric analysis (TGA). The rate of weight loss at 400° C. in air was 1.2%/hr after the first hour.

The following example illustrates the effect of the addition of 0.28 pph of distearyl pentaerythritol diphosphite to prepolymer melt before dump.

EXAMPLE 2

The charge and process were the same as in Example 1 except that at a point five minutes prior to the prepolymer dump, 1.75 g (0.28 pph based on theoretical advanced polymer yield) of distearyl pentaerythritol diphosphite was added to the prepolymer melt.

This prepolymer, after grinding and screening, was also advanced under a nitrogen sweep by the process described in Example 1. This time, the weight loss from 6.184 g of the prepolymer was found to be 5.17% from prepolymer to advanced polymer. The peak endotherm by differential scanning calorimetry was found to be at 410° C. The weight loss of this resin as determined by TGA was only 0.7% after three hours at 400° C. in air. The rate of weight loss after the first hour was only 0.2%/hr compared to 1.2%/hr as with the control sample.

The following examples compare the efficiency of addition of distearyl pentaerythritol diphosphite to the prepolymer melt with addition of distearyl pentaerythritol diphosphite to prepolymer in a rotary drum prior to advancing. Example 3 is a control in which no additive was added.

EXAMPLE 3

A mixture of 301.1 g (2.18 moles) of 4-hydroxybenzoic acid, 181.08 g (1.09 moles) of terephthalic acid, 203.98 g (1.09 moles, Assay 99.5%) of 4,4'-dihydroxyphenyl and 525 g (5.15 moles, 18% excess) of acetic anhydride was refluxed for four hours. Under a nitrogen blanket, the mixture was heated at a rate of 40° C./hr until 97.2% of the total theoretical distillate (including excess anhydride) was obtained. At this point the temperature in the reactor had reached 340° C. The contents of the reactor were dumped into an aluminum pan, allowed to cool and ground in a Wiley Mill through a 1 mm screen. A yield of 603 g was obtained.

This prepolymer was then advanced with and without addition of distearyl pentaerythritol diphosphite in a rotary drum.

WITHOUT DISTEARYL PENTAERYTHRITOL DIPHOSPHITE

A total of 200 g of the prepolymer was placed in the rotary drum and heated at a rate of 44° C./hr under a nitrogen sweep of 6 SCFH and a rotation of 15 rpm. When the temperature of the resin reached 354° C., the material was held at 354° C. for one hour and then cooled rapidly. The yield of advanced polymer was 96%. The resin had a peak endotherm at 420° C. and showed a weight loss in air of 0.84% at 400° C. after three hours (TGA). The rate of weight loss was 0.18%/hr after the first hour.

DISTEARYL PENTAERYTHRITOL DIPHOSPHITE ADDED TO DRUM

A total of 200 g of prepolymer and 0.5 g (0.250 pph) of distearyl pentaerythritol diphosphite was placed in a rotary drum and advanced as above. The yield of advanced polymer from prepolymer was 96.5%. This advanced resin had a peak endotherm at 421° C. (differential scanning calorimetry). The total weight loss at 400° C. in air after three hours was 0.87% with a rate of weight loss of 0.14%/hr after the first hour.

The following example illustrates the effect of the addition of 0.125 pph distearyl pentearythritol diphosphite to the prepolymer melt at 95% conversion.

EXAMPLE 4

The charge and the process was the same as in Example 3 except that when the total distillate yield was 95% of theoretical (including excess acetic anhydride), 0.81 g (0.125 pph based on theoretical polymer weight) of distearyl pentaerythritol diphosphite was added. (The temperature of the melt was 330° C. at this point). The mixture was heated further to 340° C. in 15 minutes and the reactor content dumped into an aluminum pan. A total distillate yield of 588 g (97.4% of theoretical including excess acetic anhydride) was obtained and the prepolymer yield was 590 g.

After grinding and screening of the prepolymer as in Example 3, 200 g was charged in a rotary drum and advanced to 354° C. and held one hour (as in Example 3). The resulting advanced polymer had a reversible first peak endotherm at 421° C. (differential scanning calorimetry). Total weight loss in air after three hours at 400° C. (TGA) was 0.75% with a rate of weight loss of 0.08%/hr after the first hour. This represents a 2.25% fold decrease in the rate of weight loss over the unstabilized polymer and a 1.75% fold decrease over that of resin prepared with twice as much distearyl pentaerythritol diphosphite added to the drum.

EXAMPLE 5

The charge and the process were the same as in Example 4 for each of the additives and additive levels shown in Table I below. The differences between additives and additive levels was the only variation from the procedure of Example 4. The additives were introduced at the point at which the total distillate yield was 95% of theoretical (including excess acetic anhydride). The relative weight loss determined is set forth in Table I.

TABLE I
OTHER PHOSPHITE ADDITIVES AND LEVELS[1]

| Phosphite | PPH[2] | Relative Rate[3] of Weight Loss 400° C., Air |
|---|---|---|
| Distearyl Pentaerythritol Diphosphite | 0.00 | 3.8 |
|  | 0.10 | 1.2 |
|  | 0.125 | 1.0 |
|  | 0.250 | 1.8 |
| Trisnonylphenyl Phosphite | 0.125 | 1.05 |
|  | 0.250 | 1.83 |
| Bis(2,4-Di-t-Butylphenyl) Pentaerythritol Diphosphite | 0.125 | 1.0 |
|  | 0.250 | 1.2 |
| Diisodecyl Pentaerythritol Disphosphite | 0.125 | 1.2 |
|  | 0.250 | 1.2 |
| Triphenyl Phosphite | 0.125 | 1.5 |

[1]In addition to optimum level of phosphite regarding rate of weight loss, too much or too little phosphite additive can affect the color and homogeniety. The above examples are based on high purity-low ash monomers.
[2]Base on phosphorus content to give equivalent pph of distearyl pentaerythritol diphospite.
[3]Relative rate of weight loss of advanced resin compared to advanced resin using 0.125 of distearyl pentaerythritol diphosphite giving 1.0 rate of weight loss as the standard.

What is claimed is:

1. A bulk polymerization process for preparing a thermally stable wholly aromatic polyester comprising:
   heat condensing wholly aromatic precursors to form a prepolymer;
   incorporating into the reaction mixture a phosphite compound, after substantial formation of the prepolymer and before advancing the prepolymer, in an amount of between about 0.05 to 0.5 parts per hundred by weight; and
   advancing the prepolymer to form a thermally stable wholly aromatic polyester having the required degree of polymerization.

2. The process of claim 1 wherein the phosphite compound is incorporated into the reaction mixture in an amount effective for substantially maximizing thermal stability as characterized by rate of weight loss at 400° C. in air of a molding of the polyester.

3. The process of claim 2 wherein the amount of the phosphite incorporated into the reaction mixture is in inverse relation to the purity of the precursors.

4. The process of claim 1 wherein the phosphite is incorporated into the reaction mixture in the amount of about 0.1 to 0.25 parts per hundred.

5. The process of claim 2 wherein the phosphite is incorporated into the reaction mixture in the amount of about 0.125 parts per hundred.

6. The process of claim 1 wherein the addition of the phosphite compound takes place at the point of about 95% conversion.

7. The process of claim 1 wherein the advancing is at a temperature of at least about 340° C.

8. The process of claim 1 wherein the phosphite compound is incorporated into the reaction mixture in melt form.

9. The process of claim 1 wherein the polyester comprises recurrent moieties selected from the following formulas:

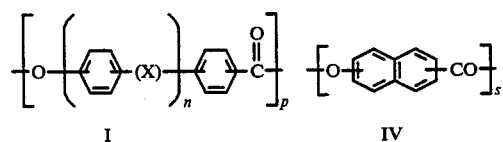

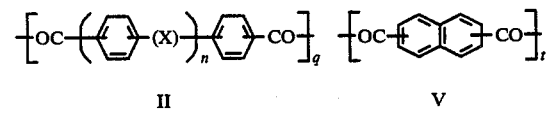

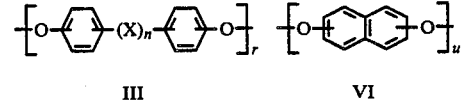

where X is O, S, CO, NH, or $SO_2$; n is zero or one; and $p+q+r+s+t+u$ is about 3 to 800.

10. The process of claim 1 wherein the aromatic polyester is an oxybenzoyl polyester.

11. The process of claim 10 wherein the precursors comprise an aromatic dicarboxylic acid, a hydroxycarboxylic acid and a aromatic diol.

12. The process of claim 11 wherein the precursors comprise terephthalic acid, hydroxybenzoic acid and dihydroxybiphenyl.

13. The process of claim 10 wherein the polyester is an oxybenzoyl polyester containing units of the formula:

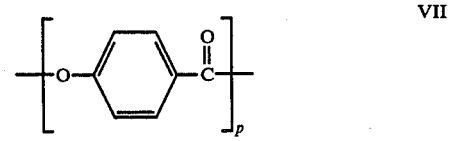

where p is about 3 to 600.

14. The process of claim 10 wherein the oxybenzoyl polyester is of the formula

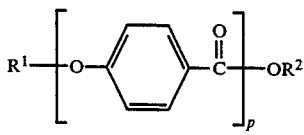

VIIa wherein $R^1$ is benzoyl, lower alkanoyl or hydrogen, $R^2$ is hydrogen, benzyl, lower alkyl or phenyl and p about 3 to 600.

15. The process of claim 1 wherein the polyester comprises recurrent moieties selected from the following formulas:

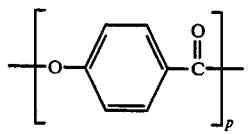 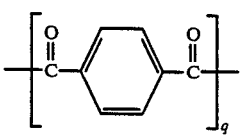

VII VIII

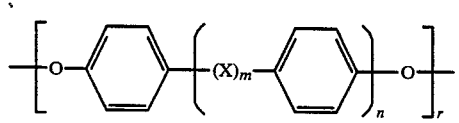

IX where X is O or $SO_2$; m is zero or one; n is zero or one; q:r is about 10:15 to 15:10; p:q is about 1:100 to 100:1; p+q+r is about 3 to 600; the carbonyl groups of the moiety of formula VII or VIII are linked to the oxy groups of the moiety of formula VII or IX; and the oxy groups of the moiety of formula VII or IX are linked to the carbonyl groups of the moiety of formula VII or VIII.

16. The process of claim 1 wherein the polyester comprises recurrent units of the following formula:

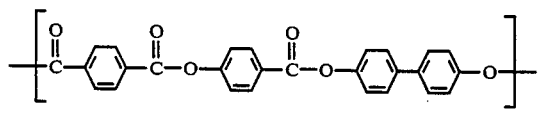

X

17. The process of claim 1 wherein the phosphite compound is selected from the group consisting of aryl phosphite, alkyl phosphite, alkyl-aryl phosphite, diphosphite and polyphosphite.

18. The process of claim 17 wherein the phosphite compound is an organic phosphite.

19. The process of claim 18 wherein the phosphite compound is distearyl pentaerythritol diphosphite.

20. A bulk polymerization process for preparing a thermally stable wholly aromatic polyester comprising:
heat condensing wholly aromatic precursors to form a prepolymer;
incorporating into the reaction mixture a phosphite compound, after substantial formation of the prepolymer and before advancing the prepolymer, in an amount which is in inverse relation to the purity of the precursors and which is effective for substantially maximizing thermal stability as characterized by rate of weight loss at 400° C. in air of a molding of the polyester; and
advancing the prepolymer to form a thermally stable wholly aromatic polyester having the required degree of polymerization.

21. A bulk polymerization process for preparing a thermally stable wholly aromatic polyester comprising:
heat condensing terephthalic acid, hydroxybenzoic acid and dihydroxybiphenyl in molar ratios of about 1:2:1 respectively, to form an oxybenzoyl prepolymer;
incorporating distearyl pentaerythritol diphosphite into the reaction mixture at the point of about 95% conversion, in an amount of about 0.1 to 0.25 parts per hundred by weight; and
advancing the oxybenzoyl prepolymer at a temperature of at least about 340° C. to form an oxybenzoyl polyester having the required degree of polymerization;
whereby thermal stability of the polyester is substantially maximized as characterized by rate of weight loss at 400° C. in air of a molding of the polyester.

22. The process of claim 11 wherein formation of the wholly aromatic precursors is by alkanoylation with an acid anhydride.

23. The process of claim 18 wherein said organic phosphite is selected from the group consisting of distearyl pentaerythritol diphosphite, trisnonylphenyl phosphite, bis(2,4-di-t-butylphenyl)pentaerythritol diphosphite, diisodecyl pentaerythritol diphosphite and triphenyl phosphite.

24. A molding composition prepared according to the process of claim 1.

25. A molded article comprising the molding composition of claim 24.

* * * * *